US009205304B1

(12) United States Patent
Hogge et al.

(10) Patent No.: US 9,205,304 B1
(45) Date of Patent: Dec. 8, 2015

(54) MULTI-COATING LAYER COLOR GOLF BALL

(71) Applicant: Acushnet Company, Fairhaven, MA (US)

(72) Inventors: Matthew F. Hogge, Plymouth, MA (US); Manjari Kuntimaddi, Raynham, MA (US); Michael J. Sullivan, Old Lyme, CT (US); Craig Moreira, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/516,665

(22) Filed: Oct. 17, 2014

(51) Int. Cl.
*A63B 37/14* (2006.01)
*A63B 37/00* (2006.01)
*C09D 5/36* (2006.01)
*C09C 1/00* (2006.01)

(52) U.S. Cl.
CPC ............ *A63B 37/0022* (2013.01); *A63B 37/005* (2013.01); *A63B 37/0023* (2013.01); *C09C 1/0021* (2013.01); *C09D 5/36* (2013.01)

(58) Field of Classification Search
CPC ........ C09D 7/12; C09D 201/00; C09D 5/028; C09D 5/36; C09C 1/0021; C09C 1/0078; C09C 1/407; C09C 2200/102; C08K 3/22; C08K 2003/2227; C08K 2003/2241; A63B 43/008; A63B 37/0022
See application file for complete search history.

(56) References Cited

U.S. PATENT DOCUMENTS

| | | | |
|---|---|---|---|
| 5,713,802 A | 2/1998 | Moriyama et al. | |
| 6,012,992 A | 1/2000 | Yavitz | |
| 6,445,809 B1 | 9/2002 | Sasaki et al. | |
| 6,462,139 B1 * | 10/2002 | Das | C08J 3/03 524/430 |
| 6,524,381 B1 | 2/2003 | Phillips et al. | |
| 6,558,277 B1 | 5/2003 | Ohira et al. | |
| 6,565,770 B1 | 5/2003 | Mayer et al. | |
| 6,569,529 B1 | 5/2003 | Phillips et al. | |
| 6,572,784 B1 | 6/2003 | Coombs et al. | |
| 6,623,379 B2 | 9/2003 | Isogawa et al. | |
| 6,635,351 B2 | 10/2003 | Ishihara et al. | |
| 6,676,543 B2 | 1/2004 | Endo | |
| 6,676,741 B2 | 1/2004 | Phillips et al. | |
| 6,710,103 B2 | 3/2004 | Norris et al. | |
| 6,730,154 B2 | 5/2004 | Inoue et al. | |
| 6,744,559 B2 | 6/2004 | Phillips | |
| 6,751,022 B2 | 6/2004 | Phillips | |
| 6,824,479 B2 | 11/2004 | Isogawa et al. | |
| 6,831,785 B2 | 12/2004 | Phillips | |
| 6,833,959 B2 | 12/2004 | Phillips | |
| 6,849,343 B2 | 2/2005 | Phillips et al. | |
| 6,991,860 B2 | 1/2006 | Phillips et al. | |
| 7,081,282 B2 | 7/2006 | Kuntz et al. | |
| 7,235,300 B2 | 6/2007 | Phillips et al. | |
| 7,278,931 B2 | 10/2007 | Manami et al. | |
| 7,291,076 B2 | 11/2007 | Watanabe | |
| 7,452,598 B2 | 11/2008 | Shiao et al. | |
| 7,678,449 B2 | 3/2010 | Jones | |
| 7,695,380 B2 | 4/2010 | Isogawa | |
| 7,717,810 B2 * | 5/2010 | Watanabe | A63B 37/0023 473/378 |
| 7,731,608 B2 | 6/2010 | Kennedy, III | |
| 7,780,550 B2 | 8/2010 | Komatsu et al. | |
| 7,806,784 B2 | 10/2010 | Ohira | |
| 7,976,412 B2 * | 7/2011 | Isogawa | A63B 37/0022 473/378 |
| 8,029,386 B2 | 10/2011 | Watanabe | |
| 8,430,768 B2 | 4/2013 | Komatsu et al. | |
| 8,435,138 B2 | 5/2013 | Shinohara et al. | |
| 8,460,124 B2 | 6/2013 | Nagasawa et al. | |
| 8,460,125 B2 | 6/2013 | Nagasawa et al. | |
| 8,469,837 B2 | 6/2013 | Komatsu et al. | |
| 8,491,417 B2 | 7/2013 | Isogawa et al. | |
| 8,523,710 B2 | 9/2013 | Isogawa et al. | |
| 8,622,851 B2 | 1/2014 | Komatsu et al. | |
| 8,641,558 B2 | 2/2014 | Ohira | |
| 8,651,977 B2 | 2/2014 | Isogawa et al. | |
| 8,678,952 B2 | 3/2014 | Shinohara et al. | |
| 2006/0287133 A1 | 12/2006 | Okabe et al. | |
| 2008/0248898 A1 | 10/2008 | Morgan et al. | |
| 2009/0075063 A1 * | 3/2009 | Iida | C09D 5/36 428/327 |
| 2009/0087675 A1 * | 4/2009 | Tonomura | C09D 5/36 428/500 |
| 2009/0111614 A1 | 4/2009 | Ohira | |

(Continued)

FOREIGN PATENT DOCUMENTS

EP 1432767 A1 6/2004

OTHER PUBLICATIONS

European Coating Tech Files; Vincentz; Gerhard Pfaff; Special Effect Pigments; 2nd revised addition; 2008. NPL-Book-1-5.

(Continued)

*Primary Examiner* — John E Simms, Jr.
(74) *Attorney, Agent, or Firm* — Margaret C. Barker

(57) ABSTRACT

Golf ball comprising a core, a cover disposed the core, and at least two coating layers surrounding the cover. At least one of the coating layers is a color effects coating layer disposed between the cover and an outer coating layer and comprising a color effects providing composition formed from a mixture of a mica-based luster pigment consisting of a metal oxide coated mica in an amount of from about 5 wt. % to about 50 wt. % of the color effects providing composition and titanium dioxide coated alumina in an amount of from about 50 wt. % to about 95 wt. % thereof. The color effects coating layer comprises the color effects providing composition in an amount of from about 1% to about 30% of total resin solids, and the color effects providing composition is formed from metal oxide coated mica and titanium dioxide coated alumina in a wt. ratio of from about 1:1 to about 1:19.

16 Claims, No Drawings

(56) References Cited

U.S. PATENT DOCUMENTS

| | | | |
|---|---|---|---|
| 2009/0249979 A1* | 10/2009 | Kaupp | C09C 1/0015 106/439 |
| 2010/0261550 A1 | 10/2010 | Nagasawa et al. | |
| 2011/0124438 A1 | 5/2011 | Morgan et al. | |
| 2012/0070568 A1* | 3/2012 | Hogge | A63B 37/0003 427/157 |
| 2013/0102717 A1* | 4/2013 | Akutagawa | C09D 5/29 524/325 |

OTHER PUBLICATIONS

BASF; We make your powder coating more colorful; Colorants and additives from BASF for powder Coating.

Prior IP; Curable, powder-based coating composition including a color effect-providing pigmen; Jul. 18, 2011.

appliance Magazine.Com; Jul. 2003 Appliance Magazine; Shimmering and Shifting colors.

BASF; Coil Coating, Pigments, crosslinkers and additives.

Special Effect Pigments Based on Silica Flakes; 2003 Maik.

Effekte Feb. 2009; When everyday life became more vibrant.

SOFQW Journal; Jan. 2, 2010; Ch. Schmidt, X. Petsitis; Interference effect pigments—New technologies in cosmetic products.

Merck; Launches Xirona Volcanic Sparks—a new color travel pigment—Product launch; Jul. 18, 2011.

Colorstream, T10-03 Tropic Sunrise Product Information.

MTRL/ Industrial Design Resources, Jul. 18, 2011.

Merck KGaA; ProductPilot.com, p. 1-2, Jul. 18, 2011.

Chemical Reviews, 1999, vol. 99, No. 7.

European Coating Journal, 8/7/199, Vincentz Verlag; Market of Opportunities.

Luster Pigments with optically variable properties; Raimund Schmid, Norbert Mronga, Volker Radtke and Oliver Seeger, Aug. 7, 1997.

European Coatings Journal, Jun. 1999; Vincetz Verlag, How do pearl luster pigments show different colours?

Chem. Rev. 1999, 99, 1963-1981; Angle-Dependent Optical effects deriving from submicron structures of films and pigments.

New effect Pigments using innovative substrates; Sigrid Teaney, Gerhard Pfaff and Katsuhisa Nitta; Apr. 1999.

New effect pigments based on S102 and AL2O3 flakes; Stephen R. Sharrock & Norbert Schuel; Jan. 2, 2000.

European Coating Journal; Apr. 2003; Vincentz, Substrates for pearlescent pigments.

Effekte, Merck Pigments—www.Merk-pigments.com, The world-a multicolored cosmos. vol. Mar. 2008.

Effekte, EMD Pigments; 50 years of effect pigments stories for tomorrow; vol. 2, 2009.

Teknor Apex; Hair Dryers from Conair have bright, shimmering, shifting colors based on innovative pigments and concentrates.

Jobwerx Manufacturing network; Color Variable pigments create broad spectrum of color effects for packaging, plastics, automobiles and consumer goods.

BASF Corporation; News Release, Apr. 6, 2004.

BASF; Performance Chemicals adding value to plastics; Grey was called silver, what should we call silver now? Variocrom Magic Silver K 1000.

Vincentz; European Coating Journal; Apr. 2003; Substrates for pearlescent pigments.

BASF; Pigments for Coating Technical Data Sheet; Variocrom Magic Gold L 1400.

Play of colors. (Materials).

Effekte; Feb. 2013, EMD Pigments.

JDSU; Material Safety Data Sheet; pp. 1-12 Mar. 22, 2004.

High-quality, high-performance pigments; Automotive and Exterior Grade Portfolio 2006-2007.

Effekte; Jan. 2001; Merck Pigments.

* cited by examiner

MULTI-COATING LAYER COLOR GOLF BALL

FIELD OF THE INVENTION

Golf balls incorporating multiple coating layers wherein at least one coating layer incorporates color effects.

BACKGROUND OF THE INVENTION

Golf balls generally comprise a core surrounded by a cover and optionally intermediate layers there between. The core and/or the cover may incorporate multiple layers and the core may be solid or have a fluid-filled center surrounded by windings and/or molded material. The cover forms a spherical outer surface, typically includes a plurality of dimples, and may be formed from a variety of thermoset and/or thermoplastic materials depending on the desired cover properties and overall golf ball performance characteristics being targeted. Additionally, one or more coating layers may surround the cover.

While a majority of golf balls are white, some golfers enjoy distinguishing themselves on the course by playing a golf ball having a unique visual appearance. Accordingly, golf ball manufacturers began to incorporate color and color effects into golf balls, becoming particularly interested in mica due at least in part to its availability as a natural resource. For example, titanium dioxide-coated mica was incorporated into golf ball layers and coatings.

Unfortunately, however, an undesirable "yellow cast" has been observed with respect to golf balls incorporating titanium dioxide-coated mica caused by impurities present in the mica. See, e.g., U.S. Pat. No. 8,641,558 of Ohira @ Col. 1, ll. 25-32 and Col. 6, ll. 38-43. Further, others have demonstrated that golf balls incorporating titanium dioxide-coated mica possess inferior "distinguishability" and appear less "high-grade looking". See, e.g., U.S. Pat. No. 8,523,710 of Isogawa et al. ("Isogawa") in TABLE I @ Comp. Example 2 versus Examples 1-6, and TABLE II @ Comp. Example 6 versus Examples 7-13.

Yet, mica's layered structure and unique reflective and refractive properties when exposed to light motivate manufacturers to overcome the drawbacks of prior mica-based pigments. The present invention addresses and solves this need.

SUMMARY OF THE INVENTION

Accordingly, a golf ball of the invention comprises a core, a cover disposed the core, and at least two coating layers surrounding the cover; wherein at least one of the coating layers is a color effects coating layer disposed between the cover and an outer coating layer; the color effects coating layer comprising a color effects providing composition formed from a mixture of a mica-based luster pigment consisting of a metal oxide coated mica in an amount of from about 5 wt. % to about 50 wt. % of the color effects providing composition and titanium dioxide coated alumina in an amount of from about 50 wt. % to about 95 wt. % of the color effects providing composition.

As used herein, the term "mixture" refers to combining the metal oxide coated mica and titanium dioxide coated alumina in the amounts disclosed herein and forming the color effects providing composition. In this regard, the color effects providing composition may be formed from metal oxide coated mica and titanium dioxide coated alumina in a wt. ratio of from about 1:1 to about 1:19. In one embodiment, the color effects providing composition is formed from metal oxide coated mica and titanium dioxide coated alumina in a wt. ratio of about 1:19. In another embodiment, the color effects providing composition is formed from metal oxide coated mica and titanium dioxide coated alumina in a wt. ratio of about 1:9. In yet another embodiment, the color effects providing composition is formed from metal oxide coated mica and titanium dioxide coated alumina in a wt. ratio of about 1:3. In still another embodiment, the color effects providing composition is formed from metal oxide coated mica and titanium dioxide coated alumina in a wt. ratio of about 1:1. The synergy of such a mixture within the color effects coating layer produces a unique, distinctive, and high grade looking color appearance that is visually devoid of a yellow cast.

The color effects coating layer comprises a reaction product of the color effects providing composition, a resin, a crosslinking agent and a solvent. The color effects coating layer may comprise the color effects providing composition in an amount of from about 1% to about 30% of total resin solids. In one embodiment, the resin comprises at least one polyurethane. However, it is contemplated that the resin may comprise any coating composition suitable for combining with the color effects providing composition to produce an aesthetically pleasing, distinguishable and high grade appearance.

The color effects providing composition and resin, combined, may be mixed with the crosslinking agent in a wt. ratio of from about 1.5:1 to about 35:1. The solvent may comprise $H_2O$, for example. The cover may comprise at least one of an ionomer resin and a urethane composition. The color effects coating layer may have a thickness of from about 0.1 μm to about 50 μm. The color effects coating layer and the outer coating layer, combined, may have a thickness of from about 0.1 μm to about 100 μm.

In one golf ball construction, an inner coating layer is disposed between the cover and the color effects coating layer. In this embodiment, the inner coating layer, color effects coating layer, and outer coating layer, combined, may have a thickness of from about 0.1 μm to about 100 μm.

DETAILED DESCRIPTION

Several embodiments of a golf ball of the invention are specified in golf balls Ex. 1 through Ex. 11 of TABLES I and II below. These examples are provided in order to demonstrate that golf balls of the invention may display numerous unique, distinctive and high quality looking overall color appearances and without displaying a yellow cast. However, the examples are included herein for illustrative purposes only and in no manner limit the present invention to the disclosures therein.

The constructions and properties are set forth in TABLE IA and TABLE IB below. In particular, golf balls Ex. 1-Ex. 11 have identical constructions and compositions except for the composition of inner coating layer $CL_1$.

Golf balls Ex. 1-Ex. 11 each have a polybutadiene core having a diameter of 1.550 inches and is formulated to have a compression of about 64. The cores of golf balls EX. 1-Ex. 11 are formed from a rubber composition containing a base rubber, a free-radical initiator agent, a cross-linking co-agent, and fillers. The rubber composition is cured using a conventional curing process. Meanwhile, each cover is formed from the same ionomeric blend. Additionally, an innermost coating layer $CL_1$ is disposed between the cover and a clear primer coating layer $CL_2$. Finally, a clear topcoat $CL_3$ surrounds $CL_2$.

TABLE IA

| Golf Ball Construction | Ingredients | EXAMPLES WEIGHT RATIOS | | | | | |
|---|---|---|---|---|---|---|---|
| | | Ex. 1 | Ex. 2 | Ex. 3 | Ex. 4 | Ex. 5 | Ex. 6 |
| Cover Thickness: 0.060 in. | Surlyn® 8940[1]/ | 70 | 70 | 70 | 70 | 70 | 70 |
| | Surlyn® 9945 | 30 | 30 | 30 | 30 | 30 | 30 |
| | Pigment: $TiO_2$ | | | | | | |
| Coating Layer $CL_1$ Thickness: ~5 μm | $M_1$ and Resin[2] | 100 | | | | | |
| | $M_2$ and Resin | | 100 | | | | |
| | $M_3$ and Resin | | | 100 | | | |
| | $M_4$ and Resin | | | | 100 | | |
| | $M_5$ and Resin | | | | | 100 | |
| | $M_6$ and Resin | | | | | | 100 |
| | Cross Linker[3] | 2.9 | 2.9 | 2.9 | 2.9 | 2.9 | 2.9 |
| | Solvent[4] | 9.0 | 9.0 | 9.0 | 9.0 | 9.0 | 9.0 |
| Indicia | Black, via printing plate | Yes | Yes | Yes | Yes | Yes | Yes |
| $CL_2$ Thickness: ~5 μm | Clear Primer | Yes | Yes | Yes | Yes | Yes | Yes |
| $CL_3$ Thickness: ~25 μm | Clear Topcoat | Yes | Yes | Yes | Yes | Yes | Yes |
| Hue of Color Effect | — | Red | Blue | Orange | Violet | Green | Gold |
| Distinguish-ability | Rating 1-10 | 1 | 1 | 1 | 1 | 1 | 1 |
| High Quality Looking | Rating 1-10 | 1 | 1 | 1 | 1 | 1 | 1 |
| Yellow Cast | Rating: Yes/No | No | No | No | No | No | No |

[1]Surlyn® 8940 and Surlyn® 9945 are ionomer resins available from Dupont.
[2]A polyurethane resin.
[3]CX-100 available from DSM Coating Resins LLC.
[4]$H_2O$.

TABLE IB

| Golf Ball Construction | Ingredients | EXAMPLES WEIGHT RATIOS | | | | |
|---|---|---|---|---|---|---|
| | | Ex. 7 | Ex. 8 | Ex. 9 | Ex. 10 | Ex. 11 |
| Cover Thickness: 0.060 in. | Surlyn® 8940[1]/ | 70 | 70 | 70 | 70 | 70 |
| | Surlyn® 9945 | 30 | 30 | 30 | 30 | 30 |
| | Pigment: $TiO_2$ | | | | | |
| Coating Layer $CL_1$ Thickness: ~5 μm | $M_7$ and Resin[2] | 100 | | | | |
| | $M_8$ and Resin | | 100 | | | |
| | $M_9$ and Resin | | | 100 | | |
| | $M_{10}$ and Resin | | | | 100 | |
| | $M_{11}$ and Resin | | | | | 100 |
| | Cross Linker[3] | 2.9 | 2.9 | 2.9 | 2.9 | 2.9 |
| | Solvent[4] | 9.0 | 9.0 | 9.0 | 9.0 | 9.0 |
| Indicia | Black, via printing plate | Yes | Yes | Yes | Yes | Yes |
| $CL_2$ Thickness: ~5 μm | Clear Primer | Yes | Yes | Yes | Yes | Yes |
| $CL_3$ Thickness: ~25 μm | Clear Topcoat | Yes | Yes | Yes | Yes | Yes |
| Hue of Color Effect | — | Red | Blue | Violet | Green | Gold |
| Distinguish-ability | Rating 1-10 | 1 | 1 | 1 | 1 | 1 |
| High Quality Looking | Rating 1-10 | 1 | 1 | 1 | 1 | 1 |
| Yellow Cast | Rating: Yes/No | No | No | No | No | No |

[1]Surlyn® 8940 and Surlyn® 9945 are ionomer resins available from Dupont.
[2]A polyurethane resin.
[3]CX-100 available from DSM Coating Resins LLC.
[4]$H_2O$.

Referring to TABLES IA and IB, each $CL_1$ of golf balls EX. 1-Ex. 11 comprises one of color effects providing compositions $M_1$-$M_{11}$, respectively. $M_1$-$M_{11}$ are similar in that each consists of a mixture of metal oxide coated mica and titanium dioxide coated alumina in a wt. ratio of 1:1.

However, $M_1$-$M_{11}$ differ with respect to at least one of the specific metal oxide coated mica and titanium dioxide coated alumina selected for incorporation in the mixture. In particular, color effects providing compositions $M_1$-$M_6$ differ from $M_7$-$M_{11}$ at least in that the titanium dioxide coated alumina selected for $M_1$-$M_6$ is from the Xirallic®Series, available from EMD Performance materials, whereas the titanium dioxide coated alumina selected for $M_7$-$M_{11}$ is Mearlin® Bright Silver Series, available from BASF.

And further, within $M_1$-$M_6$, each of $M_1$-$M_6$ produces a different color effect hue (namely red, blue, orange, violet, green and gold, respectively) within the Mearlin®Interference Color Series. Similarly, within $M_7$-$M_{11}$, each of $M_7$-$M_{11}$ produces a different color effect hue (namely red, blue, violet, green and gold, respectively) within the Mearlin®Interference Color Series.

Golf balls EX. 1-Ex. 11 were rated from 1-10 with respect to distinguishability and high quality appearance (a rating of 1 being the highest possible score), and rated yes/no regarding presence of yellow cast. In this regard, visual evaluations of these parameters were conducted with respect to golf balls EX. 1-Ex. 11 by 10 persons skilled in the golf ball art ("viewers"). As recorded in TABLES I and II, each of golf balls EX. 1-Ex. 11 were assigned the highest possible score of 1 with respect to distinguishability because 9 of the 10 viewers thought that each of golf balls EX. 1-Ex. 11 were easily spotted on the grass outdoors on a sunny day (from a standing position). Similarly, each of golf balls EX. 1-Ex. 11 were assigned the highest possible score of 1 with respect to high quality appearance since all viewers thought each of golf balls EX. 1-Ex. 11 possess an upscale appearance. Finally, none of the viewers detected the presence of a yellow cast concerning golf balls EX. 1-Ex. 11. Thus, a golf ball of the invention possesses optimum distinguishability and high quality appearance without the yellow cast present in prior mica-containing golf balls. This result is synergistically produced by the interplay between the unique light scattering properties produced by a mixture of metal oxide coated mica and titanium dioxide coated alumina and in the amounts disclosed herein.

While $CL_1$ of golf balls EX. 1-Ex. 11 include the metal oxide coated mica and titanium dioxide coated alumina in equal relative amounts of 50 wt. % of the color effects providing composition, other embodiments are also envisioned. For example, the metal oxide coated mica and titanium dioxide coated alumina may alternatively be mixed to form the color effects providing composition in relative wt. % amounts of 5 wt. % to about 10 wt. % and 90 wt. % to about 95 wt. %, respectively. In yet another embodiment, the metal oxide coated mica and titanium dioxide coated alumina are mixed to form the color effects providing composition in relative wt. % amounts of 10 wt. % to about 25 wt. % and 75 wt. % to about 90 wt. %, respectively. In still another embodiment, the metal oxide coated mica and titanium dioxide coated alumina are mixed to form the color effects providing composition in relative wt. % amounts of 10 wt. % to about 25 wt. % and 75 wt. % to about 90 wt. %, respectively.

In one embodiment, the color effects providing composition is formed from metal oxide coated mica and titanium dioxide coated alumina in a wt. ratio of about 1:16. In another embodiment, the color effects providing composition is formed from metal oxide coated mica and titanium dioxide coated alumina in a wt. ratio of about 1:14. In yet another embodiment, the color effects providing composition is formed from metal oxide coated mica and titanium dioxide coated alumina in a wt. ratio of about 1:12. In still another embodiment, the color effects providing composition is formed from metal oxide coated mica and titanium dioxide coated alumina in a wt. ratio of about 1:10. In an alternative embodiment, the color effects providing composition is formed from metal oxide coated mica and titanium dioxide coated alumina in a wt. ratio of from about 1:10 to about 1:2. Embodiments are also envisioned wherein the metal oxide coated mica and titanium dioxide coated alumina are included in a wt. ratio of about 3:4, or about 2:7, or about 3:8, or about 4:9, or about 5:13, or about 5:17, or about 7:9, or about 8:19, for example.

In still other embodiments, coating layer $CL_1$ and/or other golf ball layers may further comprise one or more known effects pigments such as those disclosed in *Special Effects Pigments, Technical Basics and Applications,* 2d Edition, Hannover:Vincentz Network, 2008, hereby incorporated by reference herein in its entirety. And it is understood that where a solvent is included in forming $CL_1$, the solvent may comprise or include any known solvent as needed based on the particular coating system adopted—i.e., waterborne, etc. Viscosity modifiers may be appropriate in some embodiments.

Meanwhile, in a rubber containing core or layer of a golf ball of the invention, the base rubber may be selected from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers selected from polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, metallocene-catalyzed elastomers, and plastomers.

Suitable curing processes include, for example, peroxide curing, sulfur curing, radiation, and combinations thereof. In one embodiment, the base rubber is peroxide cured. Organic peroxides suitable as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Peroxide free-radical initiators are generally present in the rubber compositions in an amount within the range of 0.05 to 15 parts, preferably 0.1 to 10 parts, and more preferably 0.25 to 6 parts by weight per 100 parts of the base rubber. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the cross-linking agent is selected from zinc salts of acrylates, diacrylates, methacrylates, and dimethacrylates. When the cross-linking agent is zinc diacrylate and/or zinc dimethacrylate, the agent typically is included in the rubber composition in an amount within the range of 1 to 60 parts, preferably 5 to 50 parts, and more preferably 10 to 40 parts, by weight per 100 parts of the base rubber.

In a preferred embodiment, the cross-linking agent used in the rubber composition of the core and epoxy composition of the intermediate layer and/or cover layer is zinc diacrylate ("ZDA"). Adding the ZDA curing agent to the rubber composition makes the core harder and improves the resiliency and COR of the ball. Adding the same ZDA curing agent epoxy composition makes the intermediate and cover layers harder and more rigid. As a result, the overall durability, toughness, and impact strength of the ball is improved.

Sulfur and sulfur-based curing agents with optional accelerators may be used in combination with or in replacement of the peroxide initiators to cross-link the base rubber. High energy radiation sources capable of generating free-radicals may also be used to cross-link the base rubber. Suitable examples of such radiation sources include, for example, electron beams, ultra-violet radiation, gamma radiation, X-ray radiation, infrared radiation, heat, and combinations thereof.

The rubber compositions may also contain "soft and fast" agents such as a halogenated organosulfur, organic disulfide, or inorganic disulfide compound. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95. ZnPCTP is commercially available from EchinaChem (San Francisco, Calif.). These compounds also may function as cis-to-trans catalysts to convert some cis-1,4 bonds in the polybutadiene to trans-1,4 bonds. Peroxide free-radical initiators are generally present in the rubber compositions in an amount within the range of 0.05 to 10 parts and preferably 0.1 to 5 parts. Antioxidants also may be added to the rubber compositions to prevent the breakdown of the elastomers. Other ingredients such as accelerators (for example, tetra methylthiuram), processing aids, processing oils, dyes and pigments, wetting agents, surfactants, plasticizers, as well as other additives known in the art may be added to the composition. Generally, the fillers and other additives are present in the rubber composition in an amount within the range of 1 to 70 parts by weight per 100 parts of the base rubber. The core may be formed by mixing and forming the rubber composition using conventional techniques.

Cores, intermediate layers, and cover layers may be formed from an ionomeric material including ionomeric polymers, preferably highly-neutralized ionomers (HNP). In another embodiment, the intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Any golf ball component, namely core, intermediate layer, cover, etc. may also be formed from or comprise or include or be blended or otherwise combined or mixed with any of the following compositions as known in the art to achieve particular desired golf ball characteristics:

(1) Polyurethanes, such as those prepared from polyols and diisocyanates or polyisocyanates and/or their prepolymers, and those disclosed in U.S. Pat. Nos. 5,334,673 and 6,506,851;
(2) Polyureas, such as those disclosed in U.S. Pat. Nos. 5,484,870 and 6,835,794; and
(3) Polyurethane-urea hybrids, blends or copolymers comprising urethane or urea segments.

Suitable polyurethane compositions comprise a reaction product of at least one polyisocyanate and at least one curing agent. The curing agent can include, for example, one or more polyols. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated herein in its entirety by reference.

Meanwhile, the dimensions of each golf ball component such as the diameter of the core and respective thicknesses of the intermediate layer (s), cover layer(s) and coating layer(s) may be selected and coordinated as known in the art for targeting and achieving desired playing characteristics or feel. For example, the core may have a diameter of from about 1.47 inches (in.) to about 1.62 in.; the intermediate layer may have a thickness of from about 0.025 in. to about 0.057 in.; a core and intermediate layer, combined, may have a diameter of from about 1.57 in. to about 1.65 in.; the cover may have a thickness of from about 0.015 in. to about 0.055 in.; and the coating layers may have a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

As used herein, "indicia" is considered to mean any symbol, letter, group of letters, design, or the like, that can be added to the dimpled surface of a golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball comprising a core, a cover disposed the core, and at least two coating layers surrounding the cover; wherein at least one of the coating layers is a color effects coating layer disposed between the cover and an outer coating layer; the color effects coating layer comprising a color effects providing composition formed from a mixture of (a) a mica-based luster pigment consisting of a metal oxide coated mica in an amount of from about 5 wt. % to about 50 wt. % of the color effects providing composition; and (b) titanium dioxide coated alumina in an amount of from about 50 wt. % to about 95 wt. % of the color effects providing composition.

2. The golf ball of claim 1, wherein the color effects coating layer comprises a reaction product of the color effects providing composition, a resin, a crosslinking agent and a solvent.

3. The golf ball of claim 2, wherein the color effects coating layer comprises the color effects providing composition in an amount of from about 1% to about 30% of total resin solids.

4. The golf ball of claim 2, wherein the resin comprises at least one polyurethane.

5. The golf ball of claim 3, wherein the color effects providing composition is formed from metal oxide coated mica and titanium dioxide coated alumina in a wt. ratio of about 1:19.

6. The golf ball of claim 3, wherein the color effects providing composition is formed from metal oxide coated mica and titanium dioxide coated alumina in a wt. ratio of about 1:9.

7. The golf ball of claim 3, wherein the color effects providing composition is formed from metal oxide coated mica and titanium dioxide coated alumina in a wt. ratio of about 1:3.

8. The golf ball of claim 3, wherein the color effects providing composition is formed from metal oxide coated mica and titanium dioxide coated alumina in a wt. ratio of about 1:1.

9. The golf ball of claim 3, wherein the color effects providing composition is formed from metal oxide coated mica and titanium dioxide coated alumina in a wt. ratio of from about 1:1 to about 1:19.

10. The golf ball of claim 9, wherein the color effects providing composition and resin, combined, are mixed with the crosslinking agent in a wt. ratio of from about 1.5:1 to about 35:1.

11. The golf ball of claim 2, wherein the solvent comprises $H_2O$.

12. The golf ball of claim 1, wherein an inner coating layer is disposed between the cover and the color effects coating layer.

13. The golf ball of claim 12, wherein the inner coating layer, color effects coating layer, and outer coating layer, combined, have a thickness of from about 0.1 μm to about 100 μm.

14. The golf ball of claim 1, wherein the color effects coating layer has a thickness of from about 0.1 μm to about 50 μm.

15. The golf ball of claim 1, wherein the color effects coating layer and the outer coating layer, combined, have a thickness of from about 0.1 μm to about 100 μm.

16. The golf ball of claim 1, wherein the cover comprises at least one of an ionomer resin and a urethane composition.

* * * * *